United States Patent [19]

Peatross et al.

[11] Patent Number: 5,005,711
[45] Date of Patent: Apr. 9, 1991

[54] UTENSIL HOLDER APPARATUS

[76] Inventors: Christopher M. Peatross, 1028 Marine Ave., Apt. #138, Gardena, Calif. 90247; Ferdinand E. Flowers, 3750 Easy Ave., Long Beach, Calif. 90810

[21] Appl. No.: 509,067

[22] Filed: Apr. 13, 1990

[51] Int. Cl.$^5$ ................................................. A47F 7/00
[52] U.S. Cl. .................................... 211/70.7; 206/426; 211/13; 211/71
[58] Field of Search .................... 211/70.7, 70.6, 60.1, 211/13, 71, 1, 10, 74; 209/926; D7/637–641; 206/553, 426, 459

[56] References Cited

U.S. PATENT DOCUMENTS

| | | | |
|---|---|---|---|
| D. 110,294 | 6/1938 | Speik | D7/637 |
| D. 159,900 | 8/1950 | Gessler | D7/637 |
| 2,371,537 | 3/1945 | Mangini | 211/70.7 X |
| 2,421,782 | 6/1947 | Gibbs et al. | D7/637 X |
| 3,529,742 | 9/1970 | Cumming | 211/70.7 X |
| 4,233,083 | 11/1980 | Roberts | 209/926 X |

OTHER PUBLICATIONS

Houseware Review Feb. 1963, p. 31.
Gifts E Decorative Accessories Jan., 1978, p. 145.

*Primary Examiner*—Sarah A. Lechok
*Attorney, Agent, or Firm*—Leon Gilden

[57] ABSTRACT

An apparatus for use by visually impaired individuals, wherein a plurality of containers are provided, with an appropriate utensil designation mounted vertically and orthogonally relative to an annular rim of each container. The container includes an annular rim, wherein a plurality of diametrically aligned utensil designator members are positioned. The containers may be in a modified embodiment formed within a single unitary organization containing a series of aligned container wells. Alternatively, each container may include a generally "I" shaped clip for mounting to the rim receiving an associated utensil therein to indicate designation of an associated utensil for use with a respective container.

1 Claim, 5 Drawing Sheets

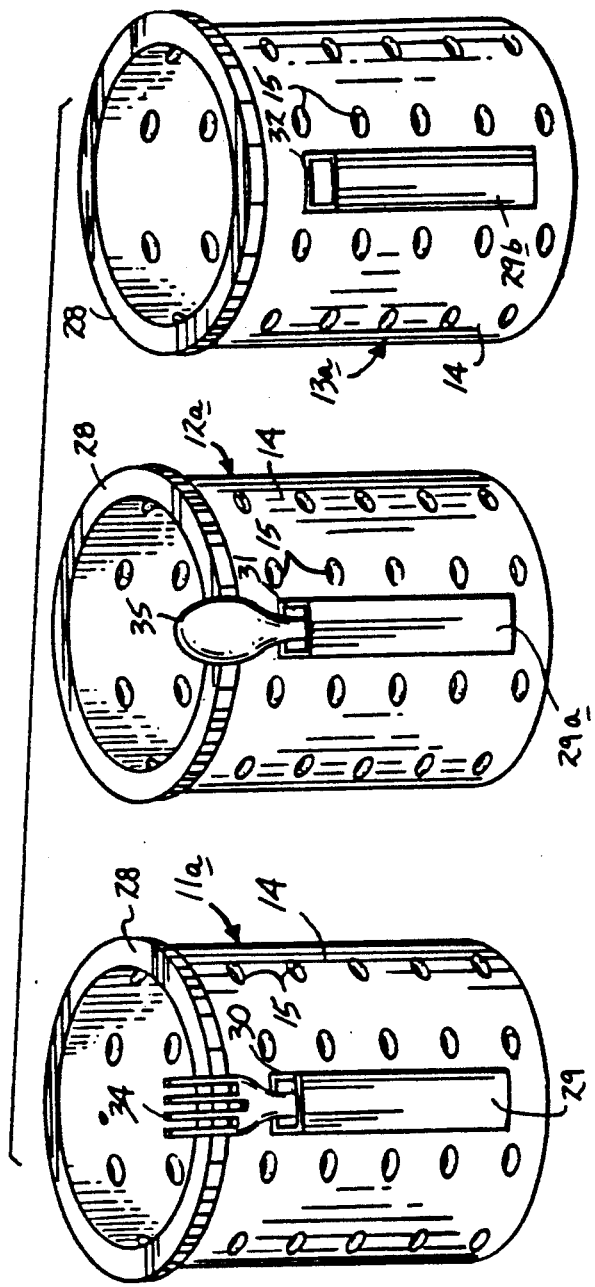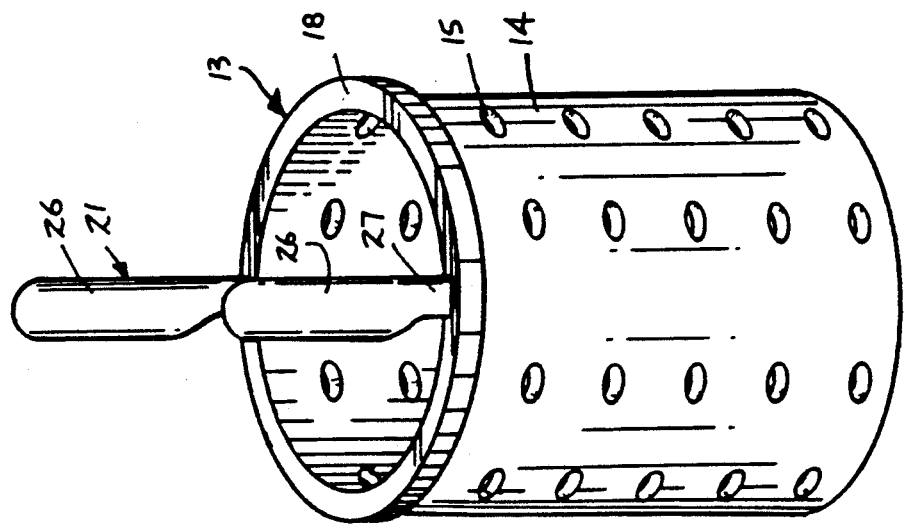

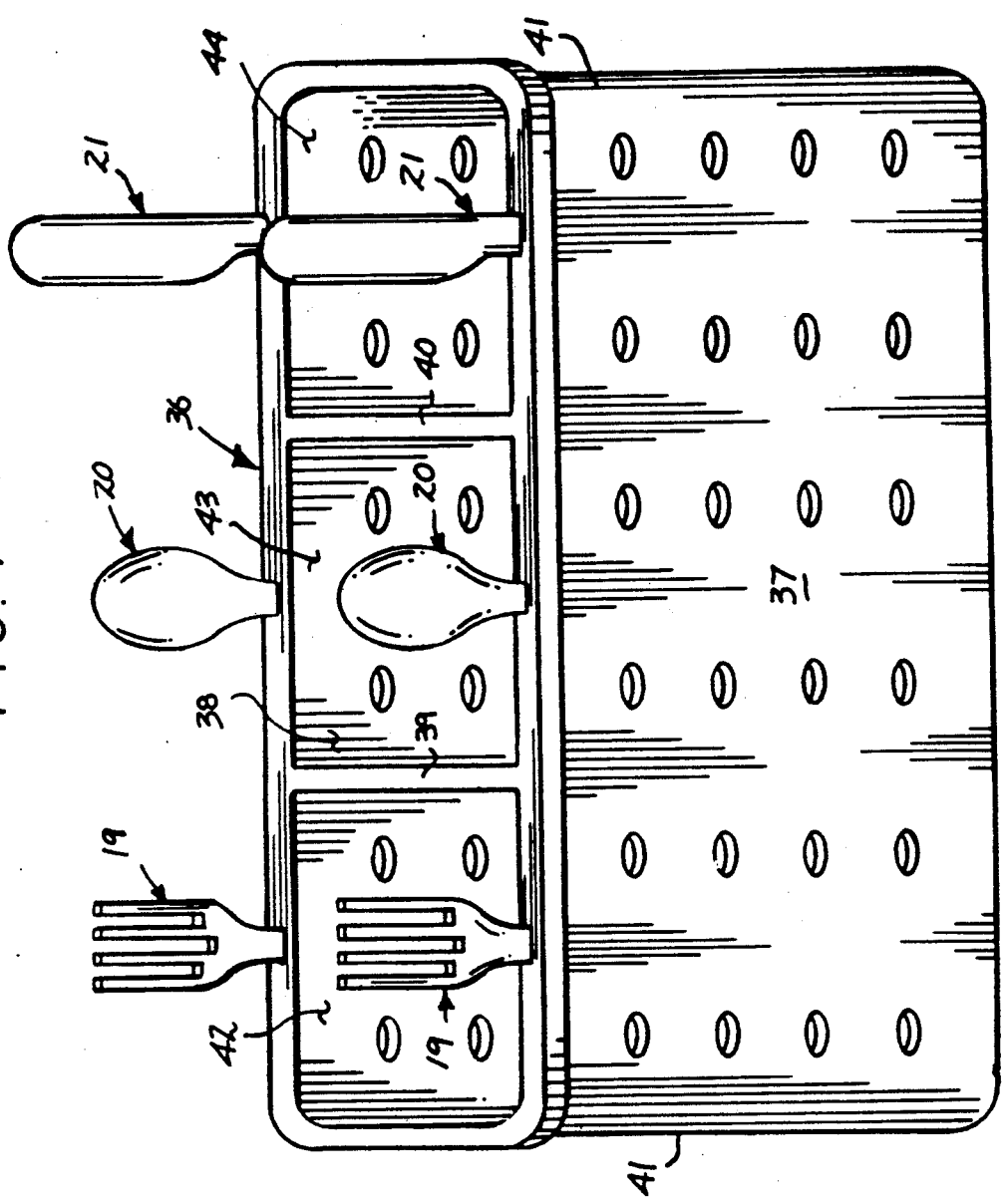
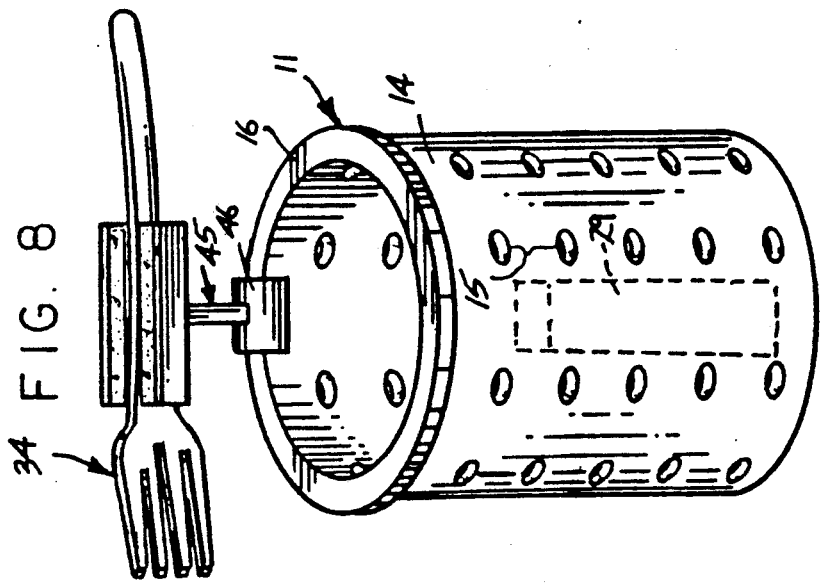

UTENSIL HOLDER APPARATUS

BACKGROUND OF THE INVENTION

1. Field of the Invention

The field of invention relates to utensil container apparatus, and more particularly pertains to a new and improved utensil holder apparatus for use by individuals with visual impairment permitting manual identification of a particular eating utensil for use with a particular container.

2. Description of the Prior Art

It is frequently awkward for individuals with a visual impairment to ascertain an appropriate utensil container, wherein utensils are typically secured in a vertical relationship within such containers, such as utilized in cafeterias and the like, in a nose-down relationship wherein the tool portion of the associated utensil is positioned downwardly within the associated support container. To position the tool portion of an associated container in a projecting relationship relative to the container results in a relative breach of sanitary relations requiring prevention of manual manipulation of the tool end portion of such utensils. The instant invention attempts to overcome deficiencies of the prior art by providing identification of such containers in a readily ascertainable configuration relative to an associated container support well. Examples of prior art support containers include U.S. Pat. No. 4,651,878 to Hafner wherein a holder includes a plate with a first hinge leg extending upwardly therefrom, with a generally "L" shaped bar for securement to define a four-sided support structure.

U.S. Pat. No. 4,632,347 to Jurgich sets forth a holder including a central set of channels to secure the handle portion of a spoon or the like therein.

U.S. Pat. No. 4,632,258 to Borner sets forth a receptacle for a kitchen utensil with an upwardly open frame portion receiving utensils therewithin.

U.S. Pat. No. 4,826,007 to Skeie sets forth a tool support structure with a central chamber, including a cylindrical outwardly extending base, including compartments for receiving various tool portions therewithin, with a lid pivotally mounted to overlie the central chamber.

U.S. Pat. No. 4,745,905 to Lucky provides for a utensil holder with spaced rings mounting a pot or the like therewithin for maintaining the pot positioned about a flame burner-type member in a cooking organization.

As such, it may be appreciated that there continues to be a need for a new and improved utensil holder apparatus wherein the same addresses both the problems of ease of use as well as effectiveness in organization and construction for individuals with vision impairment to permit manual identification of various utensils contained within an associated container organization.

SUMMARY OF THE INVENTION

In view of the foregoing disadvantages inherent in the known types of utensil holder apparatus now present in the prior art, the present invention provides a utensil holder apparatus wherein the same utilizes individual container wells defined by a surrounding container wall structure with utensil identifier members mounted relative to an opening of each well structure. As such, the general purpose of the present invention, which will be described subsequently in greater detail, is to provide a new and improved utensil holder apparatus which has all the advantages of the prior art utensil holder apparatus and none of the disadvantages.

To attain this, the present invention provides an apparatus for use by visually impaired individuals, wherein a plurality of containers are provided, with an appropriate utensil designation mounted vertically and orthogonally relative to an annular rim of each container. The container includes an annular rim, wherein a plurality of diametrically aligned utensil designator members are positioned. The containers may be in a modified embodiment formed within a single unitary organization containing a series of aligned container wells. Alternatively, each container may include a generally "I" shaped clip for mounting to the rim receiving an associated utensil therein to indicate designation of an associated utensil for use with a respective container.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved utensil holder apparatus which has all the advantages of the prior art utensil holder apparatus and none of the disadvantages.

It is another object of the present invention to provide a new and improved utensil holder apparatus which may be easily and efficiently manufactured and marketed.

It is a further object of the present invention to provide a new and improved utensil holder apparatus which is of a durable and reliable construction.

An even further object of the present invention is to provide a new and improved utensil holder apparatus which is susceptible of a low cost of manufacture with regard to both materials and labor, and which accordingly is then susceptible of low prices of sale to the consuming public, thereby making such utensil holder apparatus economically available to the buying public.

Still yet another object of the present invention is to provide a new and improved utensil holder apparatus which provides in the apparatuses and methods of the prior art some of the advantages thereof, while simultaneously overcoming some of the disadvantages normally associated therewith.

Still another object of the present invention is to provide a new and improved utensil holder apparatus wherein the same mounts utensil identification structure for use with an associated container member for support of a plurality of utensils therewithin.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric illustration of a third utensil holder apparatus of the instant invention.

FIG. 6 is an isometric illustration of a modified utensil holder apparatus utilized by the instant invention.

FIG. 7 is an isometric illustration of a modified utensil holder apparatus of the instant invention.

FIG. 8 is an isometric illustration of the holder clip utilized by the instant invention in association with a container.

DESCRIPTION OF THE PREFERRED EMBODIMENT

Figure 1:
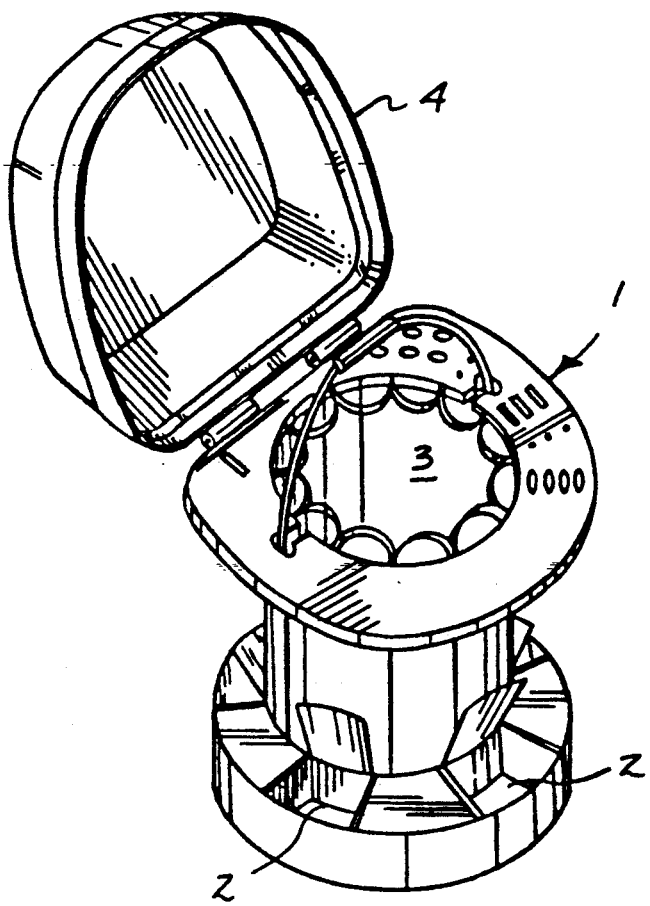
FIG. 1 is an isometric illustration of a prior art utensil holder apparatus.

With reference now to the drawings, and in particular to FIGS. 1 to 10 thereof, a new and improved utensil holder apparatus embodying the principles and concepts of the present invention and generally designated by the reference numerals 10, 11, and 12 will be described.

Figure 2:
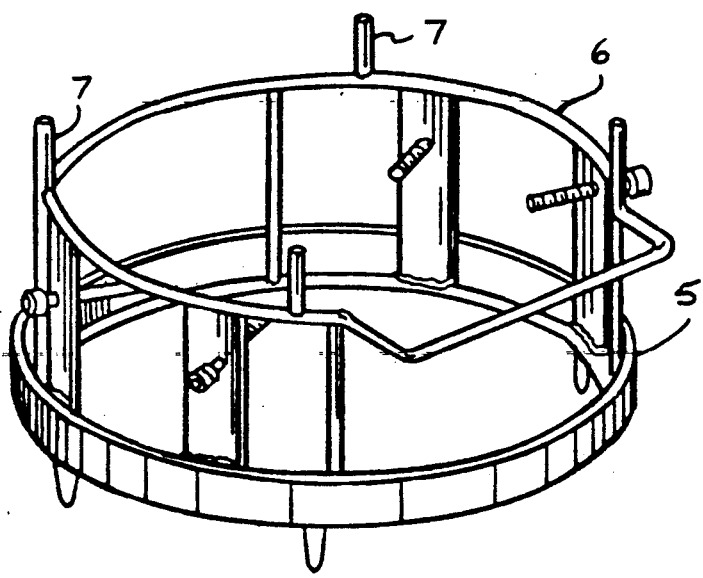
FIG. 2 is an isometric illustration of a further prior art utensil holder apparatus.
Figure 3:
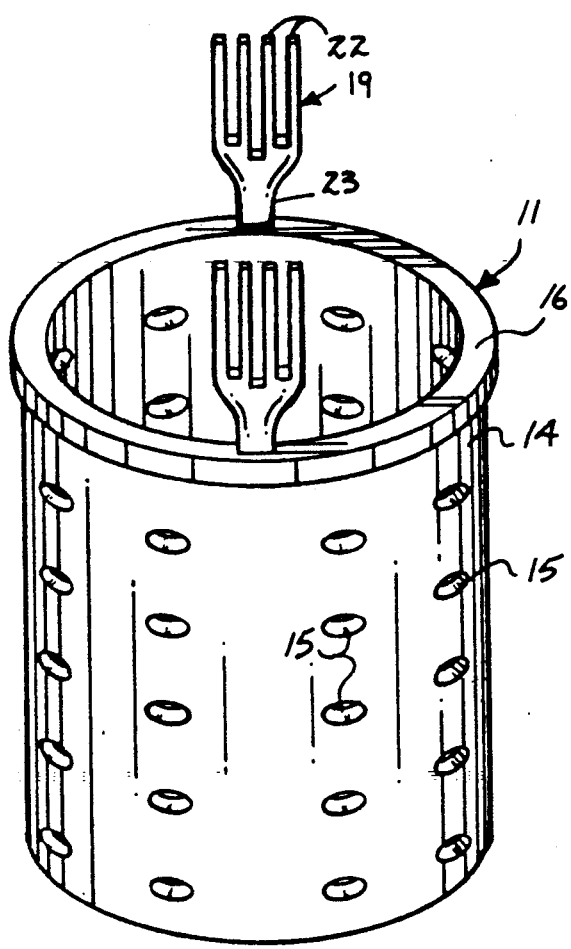
FIG. 3 is an isometric illustration of a first utensil holder apparatus holder of the instant invention.
Figure 4:
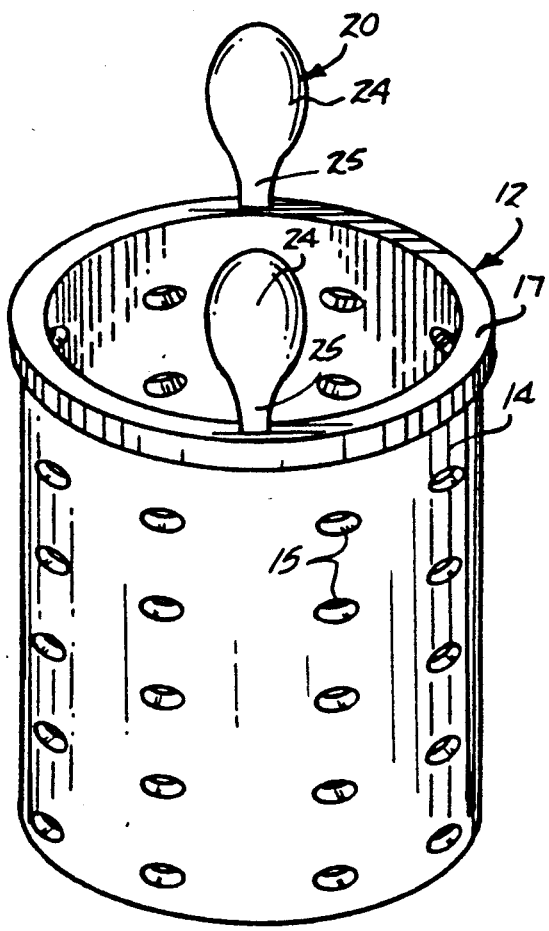
FIG. 4 is an isometric illustration of a second utensil holder apparatus of the instant invention.

FIG. 1 illustrates a prior art utensil holder apparatus 1, wherein a central cylindrical well 3 includes a base member including a series of circumferentially positioned compartments 2, with a lid 4 pivotally mounted to overlie the well 3. The prior art structure, as illustrated in FIG. 2, illustrates a utensil holder structure with a lower ring 5 mounted underlying an upper ring 6, with a series of upwardly projecting rods 7 to maintain a lid structure of an associated cooking utensil within the organization.

More specifically, the utensil holder apparatus 10 of the instant invention essentially comprises a plurality of containers including a first container 11, a second container 12, and a third container 13, each generally coaxially aligned cylindrical configurations defined by a cylindrical body 14, including a matrix of through-extending drainage apertures 15 directed through the cylinder body of each of the containers. Each of the containers includes a respective first, second, and third reinforcement upper rim 16, 17, and 18 arranged orthogonally relative to the body 14 at its upper terminal end defining an enlarged upper planar surface. Each respective rim 16, 17, and 18 include a plurality of diametrically opposed identification members integrally mounted thereon. Each identification member is associated with each of the containers, and wherein a plurality of vertical fork end members 19 are orthogonally and integrally directed upwardly from the first rim 16, with a plurality of spoon end members 20 directed orthogonally and upwardly from the second rim 17, and a plurality of knife end members 21 directed orthogonally and upwardly relative to the third rim 17. Each of the members 19, 20, and 21 are arranged generally parallel to one another and parallel to the axis of each of the respective containers 11, 12, and 13.

The fork members 19 each include a series of spaced parallel tines 22 mounted to a first narrowed support shank 23 and in turn orthogonally mounted to the rim 16 of the first container 11. The spoon end members 20 each include confronting concave spoon heads 24 coaxially aligned with associated support shank 25 that in turn is orthogonally and integrally mounted to the second rim 17. The blunt knife plates 26 are mounted to third support shanks 27, each integrally and orthogonally mounted to the third rim 18. It is understood that each of the respective shanks are arranged parallel relative to one another and diametrically opposed relative to one another on an associated rim.

FIG. 6 illustrates a modified organization utilizing a series of modified first, second, and third containers 11a, 12a, and 13a respectively. Each of the containers includes a cylindrical body 14 with the drainage apertures 15 directed through the cylindrical side walls 14 of each container. Each container further includes a reinforcing planar rim 28 mounted circumferentially thereabout orthogonally arranged relative to each axis of each respective container. Each of the modified containers further includes a respective sleeve, including a first sleeve 29, a second sleeve 29a, and a third sleeve 29b. Each sleeve is integrally mounted to the exterior surface of each of the cylindrical body or side walls or each of the containers, including a respective first, second, and third opening 31, 32, and 33 to receive a respective utensil such as a fork 34, a spoon 35, or empty or vacant sleeve 29b indicating the use of a knife within each cavity of each container. The absence of a knife minimizes injury to an individual and identifies the container. Accordingly, the containers may be interchangeably utilized, wherein an individual may simply draw a utensil from each container and direct such a utensil into an associated sleeve of each container for indication purposes and thereby permitting the containers to be interchangeably utilized for various groups of utensils.

Figure 9:
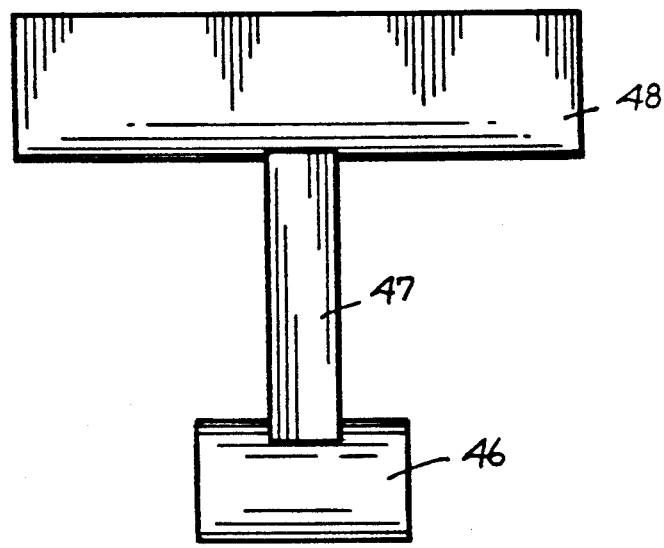
FIG. 9 is an orthographic side view, taken in elevation, of the utensil holder clip as utilized by the instant invention.
Figure 10:
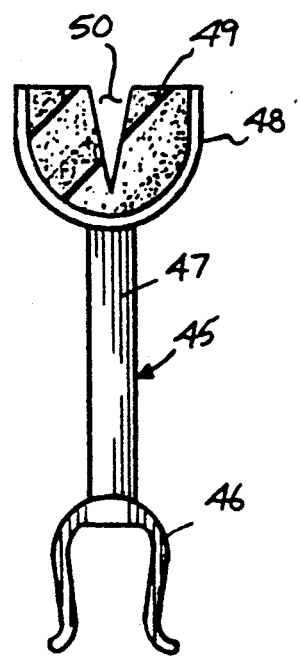
FIG. 10 is an orthographic end view, taken in elevation, of the utensil holder clip as illustrated in FIG. 9.

Further, the containers may optionally include for alternative use a support mount 45 of a type as illustrated in FIGS. 8-10. Each support mount includes a downwardly directed "U" shaped clip member 46 defined by resiliently oriented jaws biased together for securement about an associated rim. The "U" shaped clip member includes a vertical support 47 orthogonally directed upwardly from each "U" shaped clip, with its upper end integrally and orthogonally mounting an elongate utensil support. Each utensil support is of a generally "U" shaped cross-sectional configuration, including a sponge insert coextensively mounted within each upwardly directed utensil support, with each sponge insert 49 including an elongate slot 50 directed downwardly and radially through each insert 49 for reception horizontally of an associated utensil such as a fork member 34, as illustrated in FIG. 8.

FIG. 7 illustrates a modified elongate container 36, including a planar forward side wall 37 spaced from and parallel to a planar rear side wall 38. The container includes spaced parallel end walls 41. Positioned interiorly of the cavity defined by the container 36 are a plurality of partition walls defining a first partition wall 39, a second partition wall 40 orthogonally and fixedly mounted between the forward and rear side walls 37 and 38 dividing the cavity defined by the elongate container 36 into three equal compartments, including a first well cavity 42, a second medial well cavity 43, and a third well cavity 44. Each well cavity includes a respective identification member, such as a vertical fork end member 19 spaced on opposed sides of the first well cavity 42, a plurality of spoon end members 20 mounted on opposed sides of the second medial well cavity 43, and a plurality of knife end members 21 for identification mounted on each side of the third well cavity 44 for identification of contents mounted within each of the well cavities containing an associated series of forks, spoons, and knives to be mounted within a tool-down relationship.

Accordingly, it is also understood that the components, as illustrated in the FIGS. 3, 4 and 6 and 8 may be utilized in coordination with one another, i.e. specifically each container may include a designation end member, i.e. 19, 20, or 21 in association with a sleeve as well as a support mount 45.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A utensil holder apparatus comprising,
   a plurality of containers comprising a first, second, and third container, each container including an elongate longitudinally aligned body, with a rim mounted orthogonally to the body at an upper terminal end of the body, and wherein each container defines a cavity therewithin, and
   designation means mounted to the body, and the designation means is configured to provide a configurational replication of a plurality of utensils contained within the cavity of each container, and
   wherein the body is defined as a cylindrical body, the body including a matrix of apertures directed therethrough, and
   wherein each rim includes a planar top surface, and the designation means including a plurality of fork members orthogonally and integrally mounted to the first container on the rim of the first container extending coaxially parallel to a first axis of the first container, and the second container including a plurality of spoon members integrally and orthogonally mounted to the rim of the second container coaxially parallel relative to one another and to a second axis defined by the second container, and the third container including a plurality of knife end members integrally and orthogonally mounted to the rim of the third container arranged parallel to one another and to a third axis defined by the third container, the plurality of fork members serving as first manual identification means for permitting manual identification of first utensils within the first container, the plurality of spoon members serving as second manual identification means for permitting manual identification of second utensils within the second container, and the plurality of knife end members serving as third manual identification for permitting manual identification of third utensils within the third container.

* * * * *